United States Patent
Yanover

(10) Patent No.: US 7,991,436 B2
(45) Date of Patent: Aug. 2, 2011

(54) METHOD AND APPARATUS FOR POWER SAVING IN WIRELESS SYSTEMS

(75) Inventor: Vladimir Yanover, Herzlia (IL)

(73) Assignee: Alvarion Ltd., Tel-Aviv (IL)

( * ) Notice: Subject to any disclaimer, the term of this patent is extended or adjusted under 35 U.S.C. 154(b) by 546 days.

(21) Appl. No.: 11/662,489

(22) PCT Filed: Oct. 11, 2005

(86) PCT No.: PCT/IL2005/001083
§ 371 (c)(1),
(2), (4) Date: Mar. 15, 2007

(87) PCT Pub. No.: WO2006/040769
PCT Pub. Date: Apr. 20, 2006

(65) Prior Publication Data
US 2007/0298836 A1     Dec. 27, 2007

(30) Foreign Application Priority Data
Oct. 14, 2004  (IL) .......................................... 164576

(51) Int. Cl.
*H04M 1/00* (2006.01)
*H04B 1/16* (2006.01)
*G08C 17/00* (2006.01)

(52) U.S. Cl. .................. 455/574; 455/343.1; 455/343.2; 455/552.1; 370/311

(58) Field of Classification Search ............... 455/552.1, 455/439, 574, 343.2–5; 370/311
See application file for complete search history.

(56) References Cited

U.S. PATENT DOCUMENTS

| 5,301,225 | A | 4/1994 | Suzuki et al. |
| 6,480,476 | B1 | 11/2002 | Willars |
| 6,738,373 | B2 | 5/2004 | Turner |
| 7,672,263 | B2 * | 3/2010 | Sinivaara ...................... 370/318 |
| 2005/0288022 | A1 * | 12/2005 | Ryu et al. ...................... 455/439 |

FOREIGN PATENT DOCUMENTS
WO    WO 03/069934 A1    8/2003

OTHER PUBLICATIONS

Marks, Roger B., IEEE Standard 802.16 for Global Broadband Wireless Access, Oct 2003, IEEE.*

(Continued)

*Primary Examiner* — Jinsong Hu
*Assistant Examiner* — Opiribo Georgewill
(74) *Attorney, Agent, or Firm* — Browdy & Neimark PLLC

(57) ABSTRACT

A method is provided for carrying out a power saving procedure in a wireless subscriber terminal which is operative to receive at least two different services, each of which is characterized by one or more characteristics related to traffic demands associated with that service. The method comprises the following steps: classifying each of the at least two different services based on their traffic demand related characteristics into corresponding power saving classes, where there are at least two different power saving classes associated with the at least two different services; for each of the power saving classes, determining required listening windows and required sleep windows; exchanging messages between the base station and the subscriber's device for synchronizing parameters for carrying out the power saving procedure.

14 Claims, 3 Drawing Sheets

OTHER PUBLICATIONS

IEEE, Draft Standard for Local and Metropolitan Area Networks, Part 16: Air Interface for Fixed and Mobile Broadband Wireless Access System, Apr. 2005, IEEE, p. 150.*

IEEE Computer Society, "Part 16: Air Interface for Fixed and Mobile Broadband Wireless Access systems Amendment for Physical and Medium Access Control layers for Combined Fixed and Mobile Operation in Licensed Bands" IEEE P802.16e/D5, Sep. 2004, pp. 100-112.*

Yanover et al., "Sleep Mode Generic Mechanism", IEEE 802.16 Broadband Wireless Access Working Group, Nov. 2004.*

Wongthavarawat et al., "Packet scheduling for QOS support in IEEE 802.16 broadband wireless access systems", International Journal of Communication Systems, vol. 16, p. 81-96, 2003.*

Guosons Chu et al., "A QoS Architecture for the MAC Protocol of IEEE 802.16 BWA System" Communications, Circuits and Systems and West Sino Expositions, IEEE 2002, International Conference on Jun. 29-Jul. 1, 2002, Pistcataway, NJ, USA, IEEE, vol. 1, Jun. 29, 2002, pp. 435-439.

"Air interface for fixed broadband wireless access systems—amendment 1: Management Information Base" IEEE Standard for Local and Metropolitan Area Networks, Part 16, Online! Sep. 18, 2004, pp. 1-22.

Itzik Kitroser et al., "Sleep Mode and Handoff Corrections for Task Group E" IEEE 802.16 Broadband Wireless Access Working Group, Sep. 5, 2003, pp. 1-15.

Part 16: Air Interface for Fixed and Mobile Broadband Wireless Access Systems, Amendment 2: Physical and Medium Access Control Layers for Combined Fixed and Mobile Operation in Licensed Bands and Corrigendum 1, IEEE Computer, Society and the IEEE Microwave Theory and Techniques Society, pp. 111-119 and 228-234, Apr. 7, 2005.

* cited by examiner

US 7,991,436 B2

METHOD AND APPARATUS FOR POWER SAVING IN WIRELESS SYSTEMS

FIELD OF THE INVENTION

The present invention relates generally to digital communications, and in particular, to the field of power saving.

BACKGROUND OF THE INVENTION

"Draft IEEE Standard for Local and metropolitan area networks, Part 16: Air Interface for Fixed and Mobile Broadband Wireless Access Systems Amendment for Physical and Medium Access Control Layers for Combined Fixed and Mobile Operation in Licensed Bands", published on Sep. 18, 2004 will be referred herein as "IEEE 802.16 publication". The disclosure of this reference is hereby incorporated herein by reference. The IEEE 802.16 publication is an international recommendation, which is being adopted for combined fixed and mobile operations. In an attempt to achieve efficient power utilization, a "sleep mode" procedure has been defined by that standard. This sleep mode procedure comprises virtually infinite sequence of listening windows (where the subscriber's terminal is ready to communicate with a base station) interleaved with sleep windows (where the terminal may power down so as to reduce the level of consumed power). According to this recommendation, the duration of each of the listening windows has a fixed size, while the duration of the sleep windows doubles in size, up to a certain limit. This procedure gives an adequate solution to cases where "random" traffic is conveyed, e.g. "bursty" IP traffic, like WEB browsing. Such traffic is typically characterized as being associated with non-real time MAC connections and best efforts type connections.

However, a problem arises when different types of services are rendered by a base station to a plurality of subscribers' terminals associated therewith, while the sleeping mode procedure is suitable for a single type of service having a random nature. Such a sleeping mode procedure cannot be adequately applied for services such as voice/VoIP applications on one hand and some other real time applications on the other, as the latter would typically have different patterns than the above-described ones, and consequently such a sleep mode procedure cannot be applicable for all these services.

Having to provide multicast/broadcast services to the different subscribers together with, say, having to provide WEB browsing services, would impose a problem as it will be virtually impossible to handle the different types of services while applying a single type of sleep mode procedure provided by the IEEE 802.16 publication.

Another problem arises in systems that support multicast services. Typically, the terminals are designed to have both multicast connections and unicast connections with different demand patterns, so that synchronization of sleep/listening cycles between different terminals would be nearly impossible. Under the IEEE 802.16 publication's sleep mode scheme, the only reasonable solution is to interrupt the sleep mode for all relevant terminals and to arrange for data transfer. The penalty associated with interrupting terminals in their sleep mode, is, that the interrupted terminal would be re-activated from the lowest value of the sleep window, which in turn causes a decrease in the efficiency of power saving.

Yet another problem that arises is when there is a need to combine the sleep mode operations with one or more management procedures like ranging, connections creation/configuration, SNMP etc. Suppose that a terminal is currently at a sleep mode as there is no traffic to be delivered via the existing connections and there is a need to add one more connection. In this case, the base station ("BS") has to keep the terminal available for the corresponding transaction, although there is still no demand for using the existing connections, which means that there is in fact no reason to interrupt their sleep state. But in spite of the above, according to the procedure that has been commonly used in the art, the sleep mode of the terminal will be interrupted by "Traffic Indication" message (even though, as explained above, there is no traffic to be conveyed along the current connections), for applying the connection creation procedure. Consequently, the sleep mode procedure will have to be re-applied, from the lowest sleep window value.

SUMMARY OF THE INVENTION

It is therefore an object of the present invention to provide a novel method for carrying out power saving by minimizing the power consumption at mobile terminal.

It is another object of the present invention to provide a novel method for controlling the power consumption at mobile terminal so as to provide a higher efficiency of power utilization.

It is yet another object of the present invention to provide a method for carrying out power saving by minimizing the power consumption at mobile terminal which is adapted to provide several services having different power requirement patterns.

Other objects of the invention will become apparent as the description of the invention proceeds.

It is therefore provided in accordance with a first embodiment of the invention, a method for effecting power saving at a subscriber's device belonging to a wireless network which comprises a base station and at least said subscriber device, wherein said subscriber's device is adapted to receive at least two different services, each of which is characterized by one or more characteristics related to traffic demands associated with that service.

The method comprises the following steps:

classifying each of the at least two different services based on their traffic demand related characteristics, into corresponding power saving classes, provided that there are at least two different power saving classes associated with services supported by the subscriber's device;

for each of the power saving classes, determining the required listening windows and the required sleep windows;

exchanging messages between the base station and the subscriber's device for synchronizing the parameters for carrying out a power saving procedure. Such parameters preferably comprise the location of the listening/sleep windows in the time domain and conditions for terminating the whole procedure (for example, if a demand does appear at one of the connections). More preferably, the set of parameters includes a starting point for effecting the sequence of sleep/listening windows. No communication is assumed during sleep window with respect to services (connections) associated with the corresponding power saving class.

As will be appreciated by those skilled in the art, the step of classifying each of the at least two different services, can be carried by implementing any one or more of a variety of options, such as being based on the type of the service, based on the traffic demand pattern, based on the group of services to which the particular service belongs, etc., all of which should be understood to be encompassed by the present invention.

Next, during the provisioning of the different services, determining an unavailability window of time for the subscriber's device (e.g. the mobile terminal) in which no communication will be exchanged between the base station and the subscriber's device, i.e. the window at which all services associated with the terminal are inactive; and then reducing the power level at the subscriber's device, for the duration of the unavailability window(s).

The term "power saving class" as used herein, is used to denote a group of one or more services comprising one or more MAC connections (services), all of which are characterized as having similar traffic (demand) behavior, and wherein all of these connections are comprised in a single power saving class, and will be associated with the same sequence of listening and sleep windows. If we consider for example, that WEB browsing (service A) and communication to remote file server (service B) have the same traffic (demand) behavior, they may be associated with a single power saving class. However, it may happen that even though two services have the same type of traffic behavior, still the parameters of the traffic behavior are different, in which case each of the two services shall belong to a different power saving class.

According to a preferred embodiment of the invention the method provided may be initiated by the subscriber's device, upon transmitting a request for the initiation of a power saving procedure. Still, the final decision on the activation of power saving class and its appropriate parameters is preferably made by the BS.

In accordance with yet another embodiment of the invention the power saving class is selected from the group consisting of:

type 1 class, characterized in that the duration of each of the sleep windows is derived from the duration of its preceding sleep window, while the duration of the listening windows remain constant;

type 2 class, characterized in that all sleep windows are of the same duration and are interleaved with listening windows having fixed duration; and type 3 class, characterized in that it comprises a single sleep window and a single listening window.

Preferably, type 1 class of the power saving is further characterized in that no traffic is allowed to be exchanged during the duration of the sleep windows and the listening windows.

By still another embodiment of the invention, type 2 power saving class is further characterized in that exchange of traffic is prevented during the duration of the listening windows.

According to yet another embodiment of the invention, type 3 power saving class is further characterized in that no traffic is exchanged during the duration of the sleep window.

In accordance with yet another aspect of the invention there is provided a controller for controlling the duration of the power saving period allowed in the subscriber's device, and wherein preferably the controlling is done by deactivating the power saving class.

Preferably, when the service is of the type 1 class, the deactivation of the power saving class is carried out in response to the occurrence of one or more of following events:

The BS transmits (during availability window) some amount of data over a connection belonging to this Power Saving Class;

The terminal transmits a request for non-zero amount of bandwidth with respect to a service (connection) belonging to this Power Saving Class;

The terminal receives a message from the BS indicating the presence of buffered traffic addressed to the terminal;

The terminal has failed to receive traffic indication message during certain timeout interval, for example, during a listening window.

In accordance with yet another embodiment of the invention, the deactivation of the power saving class carried out in response to explicit request initiated either by the BS or by the terminal.

By yet another embodiment of the invention, deactivating of the power saving class for type 2 class of service is carried out in response to explicit request (e.g. termination request) transmitted in the form of pre-defined management messages from the BS and/or the subscriber's device.

In accordance with yet another embodiment of the invention when the service is of the type 3 class, the deactivation of the power saving procedure is carried out in response to the expiration of a listening window period.

According to another aspect of the invention there is provided a base station adapted to operate in a wireless network and comprising:

an interface operative to allow communication between the base station and a communication network associated therewith;

at least one radio transceiver capable of transmitting communication traffic towards at least one subscriber device and receive communication traffic therefrom, wherein the base station is adapted to provide the subscriber with at least two different services, each of which is characterized by one or more characteristics related to traffic demands associated with that service;

means operative to classify each of the at least two different services based on their traffic demand related characteristics into their corresponding power saving classes, provided that there are at least two different power saving classes associated with services supported by the subscriber's device;

at least one processor adapted to:

for each of the power saving classes, determine required listening windows and possible sleep windows;

exchange messages with the subscriber's device for synchronizing at least one parameter for carrying out a power saving procedure;

during provisioning of the at least two different services, determine unavailability windows of time for the subscriber's device in which no communication will be exchanged between the base station and the subscriber's device; and initiating commands whereby the subscriber's device is required to activate a power saving procedure for the duration of the unavailability windows.

According to yet another aspect of the invention there is provided a subscriber's terminal adapted to operate in a wireless network and to receive at least two different services, each of which is characterized by one or more characteristics related to traffic demands associated with that service, and wherein said subscriber's terminal comprising:

an interface operative to allow communication between the subscriber's terminal and a base station;

at least one radio transceiver operative to transmit communication traffic towards the base station and receive communication traffic therefrom;

at least one processor adapted to exchange messages with the base station for synchronizing at least one parameter for carrying out a power saving procedure; and a power controller operative to effect a reduction in the power of the at least one radio transceiver for the duration of unavailability windows of time in which no communication will be exchanged between said base station and the subscriber's terminal, in response to a pre-defined message received from the base station.

Preferably, the at least one processor is further adapted to initiate a request for transmitting a communication to the base station, by which the base station is requested to evaluate whether, and/or when, the subscriber's terminal may start a power saving procedure.

By another embodiment, the subscriber's terminal is further adapted to affect a power saving procedure in response to an appropriate message and/or a signal received from the base station.

DETAILED DESCRIPTION OF THE INVENTION

The invention will now be described by way of examples, and without limiting the generality of the foregoing.

According to a preferred embodiment provided by the present invention, the subscriber's terminal comprises multiple Sleep State Machines ("SSM"s), where the term "sleep state" refers to being in a sleep time window or in a listening window. Each one of the SSMs is associated with a Power Saving Class ("PSC") that comprises one or more services all of which are characterized by having a substantially similar traffic demand behavior (e.g. demand for transmitting a packet when a packet that is due for transmission arrives). Similarly, the Base Station (BS) comprises a set of SSMs that corresponds to that of the subscribers' terminals associated with that BS. The BS and the various subscribers' terminals exchange control messages in order to synchronize the state of the SSMs. Non-availability of a subscriber's terminal for downlink (DL) or uplink (UL) transmissions is defined as a state where all state machines are in a "sleep" state. While being at a non-available state, the subscriber's terminal may power down one or more physical operation components or perform other activities that are unrelated to its communication with the BS. According to an embodiment of the invention, the BS comprises all the SSMs required for the classes of services supported by the BS, while the SSMs comprised in the subscriber's terminal are only those that correspond to the various classes to which all the services offered by that terminal, belong.

Figure 3:
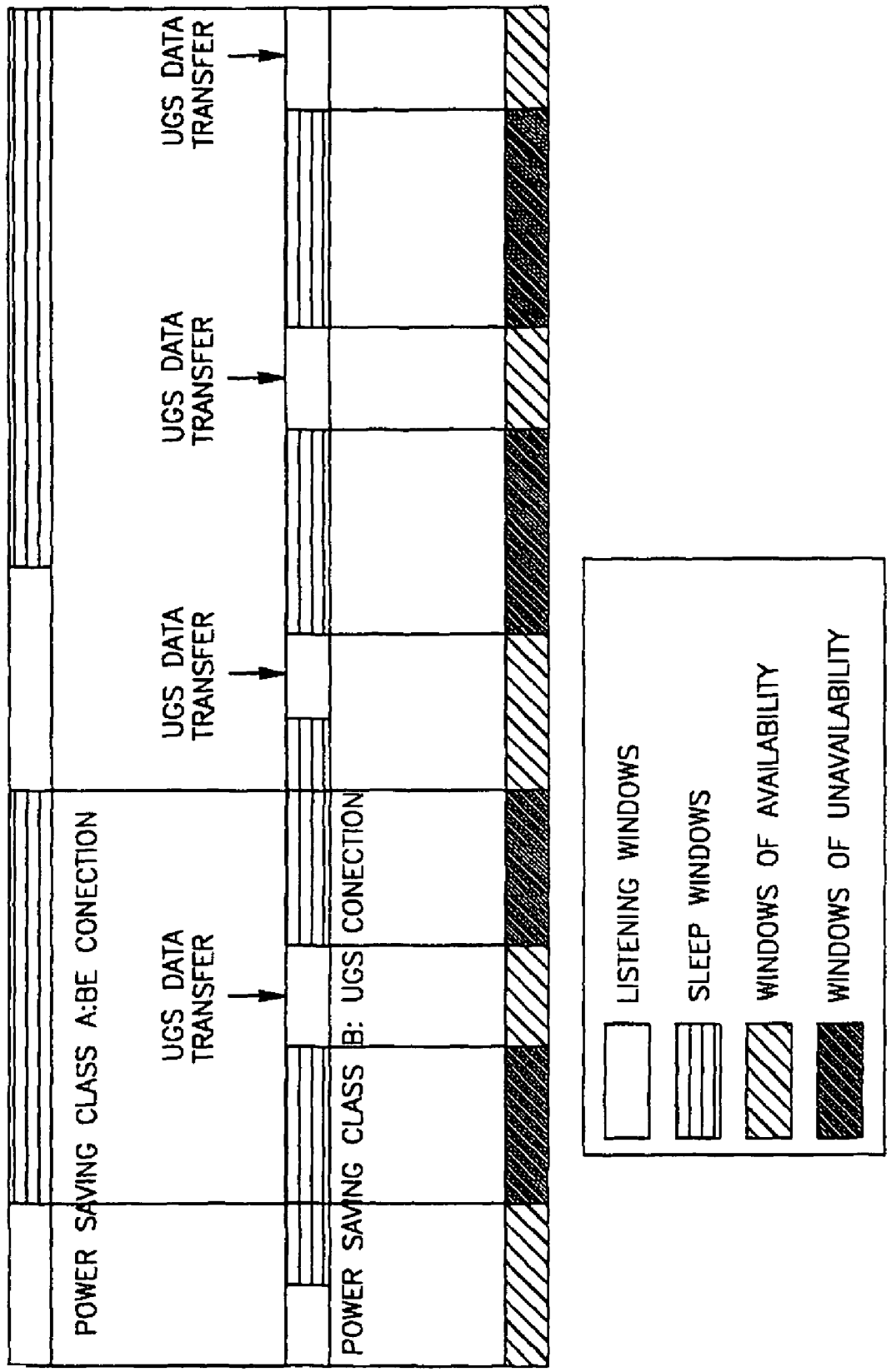
FIG. 3 illustrates an example of sleep operation mode with two power saving types of classes, one associated with service (connection) carrying traffic of WEB type and another one associated UGS service (e.g., Voice over IP) described in the with IEEE 802.16 publication.

Let us now consider FIG. 3 in which there is an illustration of an example of a terminal having two SSMs, each of which corresponds to a different PSC. Class A comprises several services that can be characterized as being of "Best Effort" type as defined in IEEE 802.16 publication and as being non-real time type. Class B of this example comprises a single service, VoIP (defined as "UGS" in terms of IEEE 802.16 publication). The BS allocates for Class A, a sequence of listening windows each having a constant duration and doubling sleep windows, i.e. each window (except for the first one following the activation of power saving class) lasts twice the time of its preceding sleep window. For Class B, the BS allocates a sequence of listening windows, each of which has a constant duration of time and an interleaved sequence of sleep windows, each again having a constant duration of time, not necessarily equal to that of the listening windows. The terminal is considered to be unavailable (and consequently may power down) within those periods of time that both Classes have their sleep windows, or in other words when the sleep windows of Class A intersects with those of Class B.

By another preferred embodiment, the BS retains one or more listening/sleeping schemes adapted for each of the subscribers' terminals associated with the BS, and wherein each one of the schemes relates to a certain Power Saving Class (PSC). As previously explained, Power Saving Class is a group of MAC connections (services), which have common power demand properties. It will be appreciated by those skilled in the art, that all "Best Efforts" connections (e.g. as defined in the IEEE 802.16 publication) may belong to a single class, hence they will all have the same sleep/listening windows. On the other hand, there could be cases where two UGS connections class, in (services) the case may each belong to a different class, in the case that they are associated with different intervals between consequent allocations. The meaning of activating a certain PSC is in fact the initiation of the sleeping/listening windows' sequence associated with that class. For the purpose of determining one or several PSCs and/or activating them, the BS and the corresponding subscriber's terminal exchange certain management messages therebetween in order to specify the type and parameters of the applicable PCS and time instance of activating the sleeping/listening windows' sequence.

After determining the possible sleeping windows for each of the applicable services as described above, an unavailability intervals are determined as those for which all active SSMs are in "sleep" state.

The term "availability interval" is used herein to denote a time interval that does not overlap with any unavailability interval. During the availability interval the terminal is expected to receive all downlink ("DL") transmissions by using the same scheme as the one implemented during normal operation (no sleep).

As mentioned hereinbefore, the second service provided by this example is VoIP (Class B). In this case, a demand for the transmission of a fixed portion of data appears periodically, so that the terminal is provided with listening windows having constant duration that will be applied around the time instances in which the terminal is expected to be operative (e.g. transmitting or receiving data), and sleeping windows are provided in-between these listening windows. Data transmission during the listening windows' periods is preferably allowed without interrupting the sleeping state. By this preferred embodiment, one of the disadvantages of the presently implemented sleep class is overcome, as there is no longer a need for the BS to terminate the sleep procedure, arrange data transfer and restart the sleep procedure, every time a VoIP demand appears.

A similar solution may be applied if Class B comprises a voice service instead of the VoIP service discussed above.

Following is an example of a method implementing the present invention where the BS is adapted to supply to the subscriber's terminal any combination of services out of those classified in the following three classes.

Power Saving Class of Type 1:

Examples of network services associated with this type are WEB browsing and communication to remote file server.

In order to establish proper operability between the BS and a subscriber's terminal using any one of the services included in this class, the BS and the terminal exchange messages that specify at least the following parameters:

Initial-sleep window;
Listening window;
Final-sleep window; and
Start time for the first sleep window.

The power saving scheme becomes active at the moment specified as Start time for the first sleep window. The duration (size) of each one of the next sleep windows may be derived from the size of its preceding sleep window. For example, each next sleep window may be twice the size of the previous window, but provided it is not greater than the value of the parameter "Final-sleep window". In addition, during listening windows, the BS may periodically transmit message(s) indicating the presence/absence of buffered DL traffic addressed to the terminal.

Sleep windows are typically interleaved with the listening windows, as the latter have fixed duration.

For example, the BS terminates active state by sending traffic indication message (e.g. MOB_TRF_IND in the IEEE 802.16 publication). A traffic indication message shall be sent by the BS during each listening window to alert the terminal that DL traffic demand appeared at the corresponding connections.

When the terminal receives a UL allocation after receiving a positive MOB_TRF-IND message indication, the terminal may confirm reception of the message by transmission of at least BR message.

During active state of Power Saving Class, the terminal is not expected to send or receive any data (e.g. MAC SDUs) or to send bandwidth requests at connections that belong to that Power Saving Class.

The Power Saving procedure becomes active at the time instant specified as Start time for first sleep window. Each next sleep window is twice of size comparatively to previous one, but not greater than specified final value Power saving class is deactivated in response to the occurrence of one or more of following events:
  The BS transmits (during availability window) a MAC SDU or fragment thereof over connection belonging to this Power Saving Class;
  The terminal transmits a request for non-zero amount of bandwidth with respect to a service (connection) belonging to this Power Saving Class; and
  The terminal receives traffic indication message (e.g. MOB_TRF-IND in IEEE 802.16 publication) indicating presence of buffered traffic addressed to the terminal.
  The terminal fails to receive traffic indication message (e.g. MOB_TRF-IND in the IEEE 802.16 publication) during a certain timeout interval, for example, during a listening window.

During the listening windows, the terminal is expected to receive all DL transmissions the same way as in the state of normal operations (no sleep).

Power Saving Classes of Type 2:

Examples of services associated with this type are UGS, RT-VR type as specified in the IEEE 802.16 publication, e.g. connections (services) of voice (VoIP) and real-time services.

In order to establish proper interoperability between the BS and a subscriber's terminal using any one of the services included in this class, the BS and the terminal exchange messages that specify at least the following parameters:
Initial-sleep window;
Listening window; and
Start time of the first sleep window.

Power Saving Class of this type becomes active at the moment specified as "Start time of the first sleep window". All sleep windows are of the same size and are interleaved with listening windows having fixed duration. Once started, the active state continues until it is explicitly terminated by terminating the associated connections (services) or by exchange of certain management messages, which specify that termination.

Unlike the Power Saving Class of Type 1 that was described above, during the listening windows of Power Saving Class Type 2, the terminal may send or receive any data at connections (services) that are included in this Power Saving Class.

Power Saving Class becomes active at the frame specified as "Start time of the first sleep window". All sleep windows are of the same size as the initial window. Sleep windows are interleaved with the listening windows having fixed duration. Power Saving procedures applied for this type are defined/activated/deactivated by certain control messages (e.g. MOB_SLP-REQ/MOB_SLP-RSP transaction in the IEEE 802.16 publication). The BS may send unsolicited message to initiate activation of Power Saving procedure (e.g. MOB_SLP-RSP in the IEEE 802.16 publication). Once initiated, the active state continues until explicit termination by specific messages like MOB_SLP-REQ/MOB_SLP-RSP in the IEEE 802.16 publication. BS may send unsolicited message (MOB_SLP-RSP in the IEEE 802.16 publication) to deactivate Power Saving Class.

As opposed to the procedure for Power Saving Class Type 1, the terminal may send or receive data at connections associated with this type of Power Saving Class, during the listening windows.

Power Saving Classes of Type 3:

Examples of services associated with this type are broadcast/multicast connections as well as management operations such as, Ranging, connection setup/change/deletion. Power Saving Classes of this type are defined/activated by certain management messages such as MOB_SLP-REQ/MOB_SLP-RSP transaction in the IEEE 802.16 publication. Deactivation of the PSC occurs automatically following the expiration of the listening window.

In order to establish proper operability between the BS and a subscriber's terminal using any one of the services included in this class, the BS and the terminal exchange messages that specify at least the following parameters:
  Final-sleep window (which may be encoded as base/exponent);
  Start time of the first sleep window; and
  Listening window.

This Power Saving Class becomes active at the moment specified as "Start time of the first sleep window". Listening window of a specified size will follow the sleep window.

The listening window, which is of a specified size, follows the sleep window. Once the listening window expires, the power saving procedure becomes automatically inactive.

Figure 1:
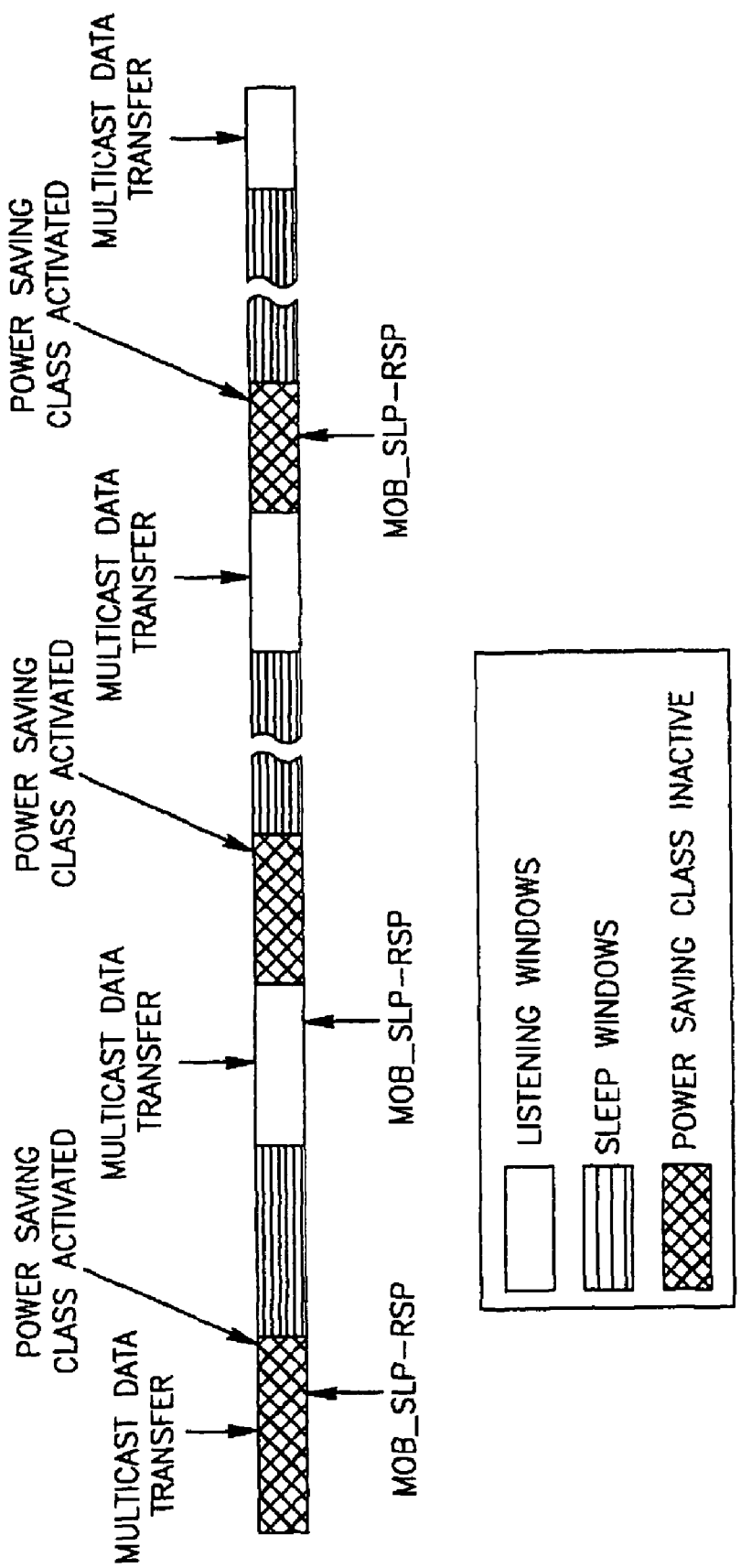
FIG. 1 illustrates an example of power saving procedure for a multicast type of service.
Figure 2:
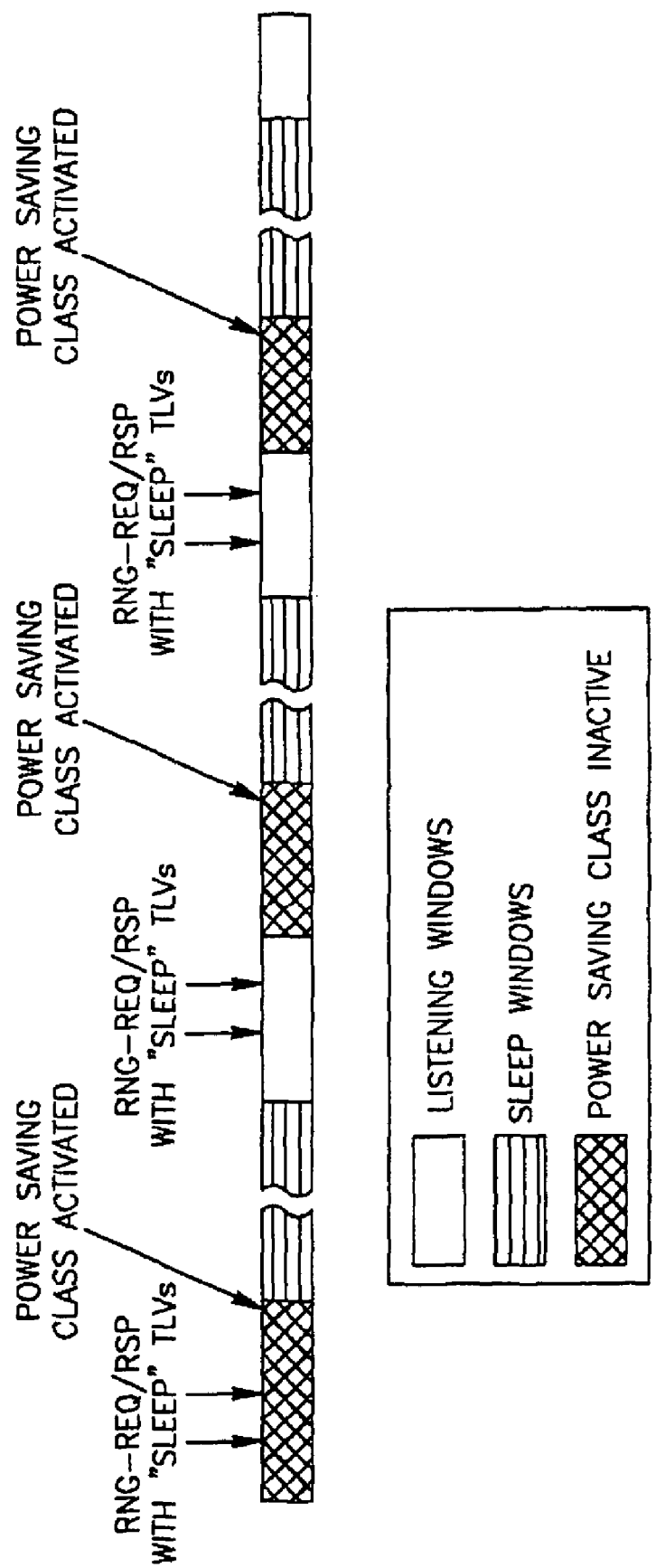
FIG. 2 illustrates an example of power saving procedure for periodic ranging.

FIG. 2 illustrates a method of using PSC of Type 3 associated with multicast connection. In the provisioning of multicast service, the BS assumes when will the next portion of data appear. In accordance with that assumption, the BS allocates a sleep interval that extends for the whole period during which no multicast traffic is expected to arrive. If during the listening window there is multicast data available, it will be transmitted to the relevant terminals. Once the listening window has expired, the BS may take the decision whether to re-activate the Power Saving Class.

Power Saving Class of type 3 may be used also for control procedures like creation or deletion of MAC connections or ranging. In this case BS transmits request and specifies duration (e.g. base/exponent) of the sleep window being equal to the time interval needed before next Periodic Ranging transaction. Then the terminal, after a specified time interval has expired, shall be available to DL transmission and then the BS may either allocate a UL transmission opportunity for ranging.

Power saving procedure of this type will be automatically deactivated after all involved connections closed.

Sleep Request and Sleep Response Messages

Terminal supporting sleep procedure uses the MOB_SLP-REQ message to request definition and/or activation of certain Power Save Classes of types 1 and 2. The MOB-SLP-REQ message is sent from the terminal to the BS on the terminal's Basic CID.

TABLE 1

Sleep-Request message format

| Syntax | Size |
|---|---|
| MOB_SLP-REQ_Message_Format( ) { | |
|     Management message type = 50 | 8 bits |
|     Number_of_Classes | 4 bits |
|     for (i = 0; i < Number_of_Classes; i++) { | |
|         Power_Saving_Class_Type | 2 bits |
|         Definition | 1 bit |
|         Operation | 1 bits |
|         If (Operation = 1) { | |
|             Start_frame_number | 8 bits |
|         } | |
|         if (Definition = 1) { | |
|             Initial-sleep window | 8 bits |
|             listening window | 8 bits |
|             final-sleep window base | 10 bits |
|             final-sleep window exponent | 3 bits |
|             Number_of_CIDs | 3 bits |
|             for (i = 0; i < No._of_CIDs; i++) | |
|             { | |
|                 CID | 16 bits |
|             } | |
|         } | |
|     } | |
| } | |

The parameters used are as follows:
Definition
    1=Definition of Power Saving Class present
Operation
    1=Activation of Power Saving Class
    0=Deactivation of Power Saving Class (for types 1 and 2 only)
Power_Saving_Class_ID
    Assigned Power Saving Class identifier. The ID shall be unique within the group of Power Saving Classes associated with the terminal. This ID may be used in further MOB_SLP-REQ/RSP messages for activation/deactivation of Power Saving Class.
Start_Frame_Number
    Start frame number for the first sleep window.
Listening Interval
    Assigned Duration of the terminal's listening interval (measured in frames). For power saving class type 2 it is not relevant and must be encoded as 0.
Initial-Sleep Window
    Assigned initial duration for the sleep window (measured in frames). For Power Saving Class type 2 it is not relevant and must be encoded as 0.
Final-Sleep Window Base
    Assigned final value for the sleep interval (measured in frames). For Power Saving Class type 2 it is not relevant and must be encoded as 0. For Power Saving Class type 2 it is the base for duration of single sleep window requested by the message.
Final-Sleep Window Exponent
    Assigned factor by which the final-sleep window base is multiplied in order to calculate the final-sleep window. The following formula is used:

$$\text{final-sleep window} = \text{final-sleep window base} \times 2^{(\text{final-sleep window exponent})}$$

For power saving class type 2 it is the exponent for the duration of single sleep window requested by the message.
CID
    CIDs of all connections comprising the Power Saving Class. This list shall contain either unicast connections, multicast connections or management connections, but not combination of connections of different types. If basic CID is encoded, it means that all the terminal's connections are included in a single class.
CID=0 is reserved for management operations.

The MOB-SLP_RSP message shall be sent from the BS to the terminal on the terminal's Basic CID in response to a MOB-SLP_REQ message, or may be sent unsolicited. The terminal shall assemble connections in power saving classes and optionally activate them as described in the message. If for certain class activation is deferred (Activation='0'), the BS may signal activation at later time in unsolicited MOB-SLP_RSP message.

TABLE 2

Sleep-Response message format

| Syntax | Size |
|---|---|
| MOB_SLP-RSP_Message_Format( ) { | |
|     Management message type = 51 | 8 bits |
|     Number_of_Classes | 4 bits |
|     for (i = 0; i < Number_of_Classes; i++) { | |
|         Power_Saving_Class_Type | 2 bits |
|         Definition | 1 bit |
|         Operation | 1 bits |
|         Reserved | 2 bits |
|         Power_Saving_Class_ID | 6 bits |
|         If (Operation = 1) { | |
|             Start_frame_number | 8 bits |
|         } | |
|         If (Definition = 1) { | |
|             initial-sleep window | 8 bits |
|             listening window | 8 bits |
|             final-sleep window base | 10 bits |
|             final-sleep window exponent | 3 bits |
|             Number_of_CIDs | 3 bits |
|             for (i = 0; i < Number_of_CIDs; i++){ | |
|                 CID | 16 bits |
|             } | |
|         } | |
|     } | |
| } | |

The parameters used are as follows:
Power_Saving_Class_Type
    Requested Power Saving Class type
Definition
    1=Definition of Power Saving Class present
Operation
    1=Activation of Power Saving Class
    0=Deactivation of Power Saving Class (for types 1 and 2 only).
Power_Saving_Class_ID
    Assigned Power Saving Class identifier. The ID shall be unique within the group of Power Saving Classes associated with the terminal. This ID may be used in further MOB_SLP-REQ/RSP messages for activation/deactivation of power saving procedure.
Start_Frame_Number
    Start frame number for first sleep window.
Listening Interval
    Assigned Duration of the terminal listening interval (measured in frames). For Power Saving Class type 2 it is not relevant and must be encoded as 0.

Initial-Sleep Window

Assigned initial duration for the sleep window (measured in frames). For Power Saving Class type 2 it is not relevant and must be encoded as 0.

Final-Sleep Window Base

Assigned final value for the sleep interval (measured in frames). For Power Saving Class type 2 it is not relevant and must be encoded as 0. For Power Saving Class type 2 it is the base for duration of single sleep window requested by the message.

Final-Sleep Window Exponent

Assigned factor by which the final-sleep window base is multiplied in order to calculate the final-sleep window. The following formula is used:

$$\text{final-sleep window} = \text{final-sleep window base} \times 2^{\wedge}(\text{final-sleep window exponent})$$

For power saving Class type 2 it is the exponent for the duration of single sleep window requested by the message.

CID

CIDs of all connections comprising the Power Saving Class. This list shall contain either unicast connections or multicast connections or management connections, but not combination of connections of different types. If Basic CID is encoded, it means that all the terminal's connections are included in a single class.

CID=0 is reserved for management operations.

It will be appreciated that the above described methods may be varied in many ways, including, changing the order of steps, and the exact implementation used.

The present invention has been described using non-limiting detailed descriptions of preferred embodiments thereof that are provided by way of example and are not intended to limit the scope of the invention. It should be understood that features described with respect to one embodiment may be used with other embodiments and that not all embodiments of the invention have all of the features shown in a particular figure. Variations of embodiments described will occur to persons of the art. Furthermore, the terms "comprise," "include," "have" and their conjugates, shall mean, when used in the claims, "including but not necessarily limited to." The scope of the invention is limited only by the following claims:

The invention claimed is:

1. A method for effecting power saving in a subscriber's device associated with a wireless network which comprises a base station and at least said subscriber device, and wherein said subscriber's device is operative to simultaneously receive at least two different services each of which is characterized by one or more characteristics related to traffic demands associated with that service, which method comprises:

classifying each of said at least two different services based on their traffic demand related characteristics, into corresponding power saving classes, provided that there are at least two different simultaneously active power saving classes associated with said at least two different services;

for each of said power saving classes, determining required listening windows and required sleep windows;

determining unavailability periods of time for said subscriber's device during which no communications will be exchanged between said base station and said subscriber's device, such that the unavailability windows are determined based on a combination of the sleep windows of said at least two simultaneously active power saving classes;

exchanging messages between said base station and said subscriber's device for synchronizing parameters for carrying out a power saving procedure to be associated with said at least two different simultaneously received services; and activating said power saving procedure in said subscriber's device based upon said synchronized parameters.

2. A method according to claim 1, further comprising a step whereby said subscriber's device transmits a request for initiating the power saving procedure.

3. A method according to claim 1, wherein said classes' types are selected from the group consisting of:

type 1, characterized in that the duration of each of said sleep windows is not pre-defined and is derived from the duration of its preceding sleep window, while the duration of said listening windows remain constant;

type 2, characterized in that all sleep windows are of the same duration and are interleaved with listening windows having fixed duration; and type 3, characterized in that it comprises a single sleep window and a single listening window.

4. A method according to claim 3, wherein said type 1 class of power saving is further characterized in that no traffic related to services comprised in said type 1 class is allowed to be exchanged during the duration of the sleep windows and the listening windows.

5. A method according to claim 3, wherein said type 2 class of power saving is further characterized in that traffic related to services comprised in said type 2 class is allowed to be exchanged during the duration of the listening windows.

6. A method according to claim 3, wherein said type 3 class of power saving is further characterized in that no traffic is allowed to be exchanged during the duration of the sleep window.

7. A method according to claim 3, wherein the service provided is of said type 1 or type 2 classes, and wherein said method further comprises a step of deactivating said power saving procedure by exchange of management messages between said base station and said subscriber's device.

8. A method according to claim 7, wherein said step of deactivating the power saving class of type 1 is carried out in response to the occurrence of one or more of following events:

said base station transmits during availability window any amount of data over connection belonging to this power saving class;

said subscriber's device transmits a request for non-zero amount of bandwidth with respect to a service (connection) belonging to said power saving class;

said subscriber's device receives traffic indication message indicating presence of buffered traffic addressed to said subscriber's device; and said subscriber's device has failed to receive traffic indication message during a certain timeout interval.

9. A method according to claim 7, wherein said step of deactivating the power saving class of type 2 is carried out in response to explicit request transmitted in a form of pre-defined management message from said base station and/or said subscriber's device.

10. A method according to claim 6, wherein the service provided is of said type 3 class and wherein said method further comprises a step of deactivating the power saving procedure in response to expiration of a listening window.

11. A base station adapted to operate in a wireless network and comprising:

an interface operative to allow communication between said base station and a communication network associated therewith;

at least one radio transceiver capable of transmitting communication traffic towards at least one subscriber device and receive communication traffic therefrom, wherein said base station is adapted to provide said subscriber with at least two different simultaneous services, each of which is characterized by one or more characteristics related to traffic demands associated with that service;

means operative to classify each of said at least two different simultaneous services based on their traffic-demand-related characteristics, into their corresponding power saving classes, provided that there are at least two different simultaneously active power saving classes associated with services supported by the subscriber's device;

at least one processor adapted to:

for each of said power saving classes, determine required listening windows and possible sleep windows;

exchange messages with said subscriber's device for synchronizing at least one parameter for carrying out a power saving procedure to be associated with said at least two different simultaneous services;

during provisioning of said at least two different simultaneous services, determine unavailability windows of time for the subscriber's device in which no communication will be exchanged between said base station and said subscriber's device, wherein the unavailability windows are determined based on a combination of the sleep windows of said at least two simultaneously active power saving classes; and transmitting a message towards said subscriber's device to activate a power saving procedure for the duration of said unavailability windows.

12. A subscriber's terminal adapted to operate in a wireless network and to simultaneously receive at least two different services, each of which is characterized by one or more characteristics related to traffic demands associated with that service, wherein said at least two different services which said subscriber's terminal is operative to simultaneously receive, are associated with at least two different simultaneously active power saving classes, and wherein said subscriber's terminal comprising:

an interface operative to allow communication between said subscriber's terminal and a base station;

at least one radio transceiver operative to transmit communication traffic towards said base station and receive communication traffic therefrom;

at least one processor adapted to exchange messages with said base station for synchronizing at least one parameter for carrying out a power saving procedure to be associated with said at least two different simultaneously received services; and a power controller operative to reduce the power of said at least one radio transceiver for the duration of unavailability windows of time in which no communication will be exchanged between said base station and said subscriber's terminal, in response to a pre-defined message received from said base station, wherein the unavailability windows are determined based on a combination of the sleep windows of said at least two simultaneously active power saving classes.

13. A subscriber's terminal according to claim 12, wherein said at least one processor is further adapted to initiate a request for transmitting a communication to said base station, by which the base station is requested to evaluate whether, and/or when, said subscriber's terminal may start a power saving procedure.

14. A subscriber's terminal according to claim 12, further adapted to effect a power saving procedure in response to an appropriate message and/or a signal received from said base station.

* * * * *